(12) United States Patent
Feng

(10) Patent No.: US 8,861,030 B2
(45) Date of Patent: Oct. 14, 2014

(54) METHOD AND SYSTEM FOR RETRIEVING PRINT MEDIA ATTRIBUTES FROM A PRINT MEDIA DATABASE SERVER

(71) Applicant: Konica Minolta Laboratory U.S.A., Inc., San Mateo, CA (US)

(72) Inventor: Ann Qiongying Feng, San Jose, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 14/265,919

(22) Filed: Apr. 30, 2014

(65) Prior Publication Data

US 2014/0233048 A1    Aug. 21, 2014

Related U.S. Application Data

(63) Continuation of application No. 13/171,991, filed on Jun. 29, 2011.

(51) Int. Cl.
| | |
|---|---|
| *G06K 1/00* | (2006.01) |
| *G06F 3/12* | (2006.01) |
| *G06F 17/00* | (2006.01) |
| *G06K 15/00* | (2006.01) |

(52) U.S. Cl.
CPC .............. *G06F 3/1208* (2013.01); *G06K 15/00* (2013.01); *G06F 3/1253* (2013.01); *G06F 3/1286* (2013.01)
USPC .......... 358/1.9; 358/1.13; 358/1.15; 707/687; 707/690; 707/695

(58) Field of Classification Search
USPC ........ 358/1.9, 1.13, 1.15, 1.16; 707/624–631, 707/636, 638, 736, 781–788, 687–703
See application file for complete search history.

(56) References Cited

U.S. PATENT DOCUMENTS

| | | | |
|---|---|---|---|
| 7,072,596 B2 | 7/2006 | Smith et al. | |
| 7,962,458 B2 * | 6/2011 | Holenstein et al. | ........... 707/704 |
| 2003/0117639 A1 | 6/2003 | Milton et al. | |
| 2009/0147295 A1 | 6/2009 | Pandit et al. | |
| 2009/0279115 A1 | 11/2009 | Martin | |
| 2010/0079790 A1 | 4/2010 | Liang et al. | |
| 2010/0169877 A1 | 7/2010 | Ackerman et al. | |
| 2011/0029498 A1 * | 2/2011 | Ferguson et al. | ............. 707/703 |
| 2011/0286037 A1 | 11/2011 | Hamada | |
| 2011/0288946 A1 | 11/2011 | Baiya et al. | |

* cited by examiner

*Primary Examiner* — Barbara Reinier
(74) *Attorney, Agent, or Firm* — Buchanan Ingersoll & Rooney PC

(57) ABSTRACT

A method of managing at least one print media database server for print media attributes of print media is disclosed, the method includes hosting print media attributes for a plurality of image forming apparatuses on the at least one print media database server, and wherein the at least one print media database server contains print media attributes for a plurality of print media from one or more manufacturers; receiving, by the at least one print media database server, additional print media attributes from either of the one or more manufacturers and one of the plurality of image forming apparatuses; confirming accuracy of the additional print media attributes; and enabling, by the at least one print media database server, access to the additional print media attributes in the print media database from the plurality of image forming apparatuses, after the accuracy of the additional print media attributes is confirmed.

10 Claims, 7 Drawing Sheets

Example of the Print Media parameters

| | Media Name | Back Coatings | Brightness | CIE Tint | CIE Whiteness | Dimension | Engine MID | Feed Direction | Front Coatings | Grain Direction | Hole Type | Imagable Side |
|---|---|---|---|---|---|---|---|---|---|---|---|---|
| 1 | Example: Letter 105 gsm Hammermill Color Copy | None | 100 | 5 | 149 | 612 792 | 0 | LEF | None | Long Edge | None | Both |
| 2 | Example: 11x17 105 gsm Hammermill Color Copy | None | 100 | 5 | 149 | 792 1224 | 0 | SEF | None | Long Edge | None | Both |
| 3 | Example: A4 64 gsm KonicaMinolta J Paper | None | 88 | | | 595 842 | 0 | LEF | None | Long Edge | None | Both |
| 4 | Example: A3 64 gsm KonicaMinolta J Paper | None | 85 | | | 842 1191 | 0 | SEF | None | Long Edge | None | Both |
| 5 | Example: A4 90 gsm Mondi MAESTRO extra | None | 93 | | | 595 842 | 0 | LEF | None | Long Edge | None | Both |
| 6 | Example A3 90 gsm Mondi MAESTRO extra | None | 93 | | | 842 1191 | 0 | SEF | None | Long Edge | None | Both |

FIG. 4

| Lab Color Value | Media Color Name | Media Color Name Details | Pre Printed | Printing Technology | Product ID | Recycled Percentage | Stock Type | Texture | Thickness | Weight |
|---|---|---|---|---|---|---|---|---|---|---|
| | White | Photo White | FALSE | | 102467 | 0 | Bond: 17x22 | Super Smooth | 127 | 105 |
| | White | Photo White | FALSE | | 102541 | 0 | Bond: 17x22 | Super Smooth | 127 | 105 |
| | White | | FALSE | | | | | Smooth | 102 | 64 |
| | White | | FALSE | | | | | Smooth | 90 | 64 |
| | White | | FALSE | | | | | Super Smooth | 121 | 90 |
| | White | | FALSE | | | | | Super Smooth | 119 | 90 |

FIG. 4 (Cont.)

METHOD AND SYSTEM FOR RETRIEVING PRINT MEDIA ATTRIBUTES FROM A PRINT MEDIA DATABASE SERVER

RELATED APPLICATIONS

This application is a continuation of U.S. patent application Serial. No. 13/171,991, filed on Jun. 29, 2011, which is incorporated herein by reference in its entirety.

FIELD OF THE INVENTION

The present invention relates to a system and method of configuring an image forming apparatus, and more particularly to a system and method for scanning and/or obtaining from a package of print media, information related to the print media and using a print media database to retrieve print media attributes.

BACKGROUND OF THE INVENTION

Physical characteristics (or print media attributes) of print media include such aspects as thickness, weight, color, reflectivity, translucency, capacity to absorb ink or toner, speed at which ink or toner dries, etc. These characteristics may affect the quality of printed output. Accordingly, configuration settings on a printer are typically adjusted or fine-tuned to produce optimal print quality based on the values of these physical characteristics.

In addition, one manufactures A4 size paper may have one set of generic physical characteristics, while another manufactures A4 size paper may have a different set of generic physical characteristics. Furthermore, with multi-functional peripheral and other printers (i.e., image forming apparatuses) providing print on demand capabilities, it is common for printers and/or image forming apparatuses to print on various types of print media. Users often customize printers by changing printer configuration settings using a user interface. The user interface may be associated with a print console, print controller, or provided on the user's computer through a print driver. In addition, the printer can be customized to suit individual preferences and/or tailored to the task at hand.

Print quality is also dependent to a large extent on generic physical characteristics of the print medium used. Today, print media has a number of variables including thickness of the print media, its translucency, reflectivity, and other physical properties impact the quality of print output. Accordingly, printer configuration must also be changed based on the type of print media being used. Because print media is typically mass-produced individual variations in media characteristics will be minimal and can be ignored. Therefore, many physical media characteristics may be treated as generic for a particular media product and a printer may be configured appropriately, when that media product is used.

Unfortunately, such configuration changes are not always easy for users to make. Moreover, given the many types of print media available, selecting the right configuration settings may involve a lot of trial and error leading to a waste of time and resources. Moreover, there is no easy way for a user to determine and/or specify the characteristics of the print media used so that an optimal configuration setting can be determined.

For most image forming apparatuses (i.e., printers) users only need to set paper weight and paper size. However, in the printing business, actually there are many more attributes like paper color, coating, grain direction, printing technology, brightness, CIE (International Commission on Illumination), Tint, whiteness, labColor, etc., which are required to obtain the highest quality output. To have all paper attributes correctly entered into the image forming apparatus or copier requires a certain level of knowledge and training for a user.

In order to make this process easy and accurate for most users to perform, it would be desirable to have a method and system for image forming apparatus or MFP (multi-function printer), which scans a package cover and/or barcode on the cover of the package of print media and processes the scanned data and matches the package of print media with print media attributes. The print media attributes are preferably retrieved from one or more cloud servers that host a print media attribute database. In addition, the print media database preferably serves multiple networked copiers and printers (i.e., image forming apparatuses), which are located all over the world, and which can effectively provide the necessary print attributes for each and every type of print and/or paper media.

SUMMARY OF THE INVENTION

In consideration of the above issues, it would be desirable to have a method of determining print media attributes of print media, which includes scanning a cover and/or bar code of a package of print media, and retrieving the print media attributes from a print media server, which hosts a database of print media attributes.

In accordance with an exemplary embodiment, a method of determining print media attributes of print media, the method comprises: obtaining information from a package of print media using an image recognition system associated with the image forming apparatus; sending the information via a network connection to at least one print media database server for determination of print media attributes for the package of print media; determining the print media attributes of the package of print media by matching the information obtained from the image recognition system to a print attribute database hosted by the at least one print media database server, the print attribute database containing print media attributes for a plurality of print media, which are available to a plurality of image forming apparatuses; and sending the print media attributes for the package of print media to the image forming apparatus, which generates printer configuration settings for the print media.

In accordance with a further exemplary embodiment, a system for printing images on a plurality of print media, comprises: at least one image forming apparatus, which determines print media indicia related to a package of print media, the at least one image forming apparatus having a memory unit and a print engine connected to the memory unit for forming an image on a print medium; at least one print media database server, the at least one print media server having a processing module, which receives information from the image forming apparatus on the indicia of the package of print media and processes the information to determine print media attributes for the package of print media; and a network connection, which connects the at least one print media database to the at least one image forming apparatus.

In accordance with another exemplary embodiment, a computer program product comprises a non-transitory computer usable medium having a computer readable code embodied therein for determining print media attributes for print media, the computer readable program code configured to execute a process, the process comprising the steps of: obtaining information from a package of print media using an image recognition system associated with the image forming apparatus; sending the information via a network connection to at least one print media database server for determination of print media attributes for the package of print media; determining the print media attributes of the package of print media by matching the information obtained from the image recognition system to a print attribute database hosted by the at least one print media database server, the print attribute database containing print media attributes for a plurality of print media, which are available to a plurality of image forming apparatuses; and sending the print media attributes for the package of print media to the image forming apparatus, which generates printer configuration settings for the print media.

In accordance with an exemplary embodiment, a method of managing at least one print media database server for print media attributes of print media, the method comprises: hosting print media attributes for a plurality of image forming apparatuses on the at least one print media database server, and wherein the at least one print media database server contains print media attributes for a plurality of print media from one or more manufacturers; receiving, by the at least one print media database server, additional print media attributes from either of the one or more manufacturers and one of the plurality of image forming apparatuses; confirming accuracy of the additional print media attributes; and enabling, by the at least one print media database server, access to the additional print media attributes in the print media database from the plurality of image forming apparatuses, after the accuracy of the additional print media attributes is confirmed.

In accordance with an exemplary embodiment, a computer program product comprises a non-transitory computer usable medium having a computer readable code embodied therein for managing at least one print media database server for print media attributes of print media, the computer readable program code configured to execute a process, the process comprising the steps of: hosting print media attributes for a plurality of image forming apparatuses on the at least one print media database server, and wherein the at least one print media database server contains print media attributes for a plurality of print media from one or more manufacturers; receiving, by the at least one print media database server, additional print media attributes from either of the one or more manufacturers and one of the plurality of image forming apparatuses; confirming accuracy of the additional print media attributes; and enabling, by the at least one print media database server, access to the additional print media attributes in the print media database from the plurality of image forming apparatuses, after the accuracy of the additional print media attributes is confirmed.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4 is a chart showing print media and corresponding print media attributes.

DESCRIPTION OF THE PREFERRED EMBODIMENTS

Figure 1:
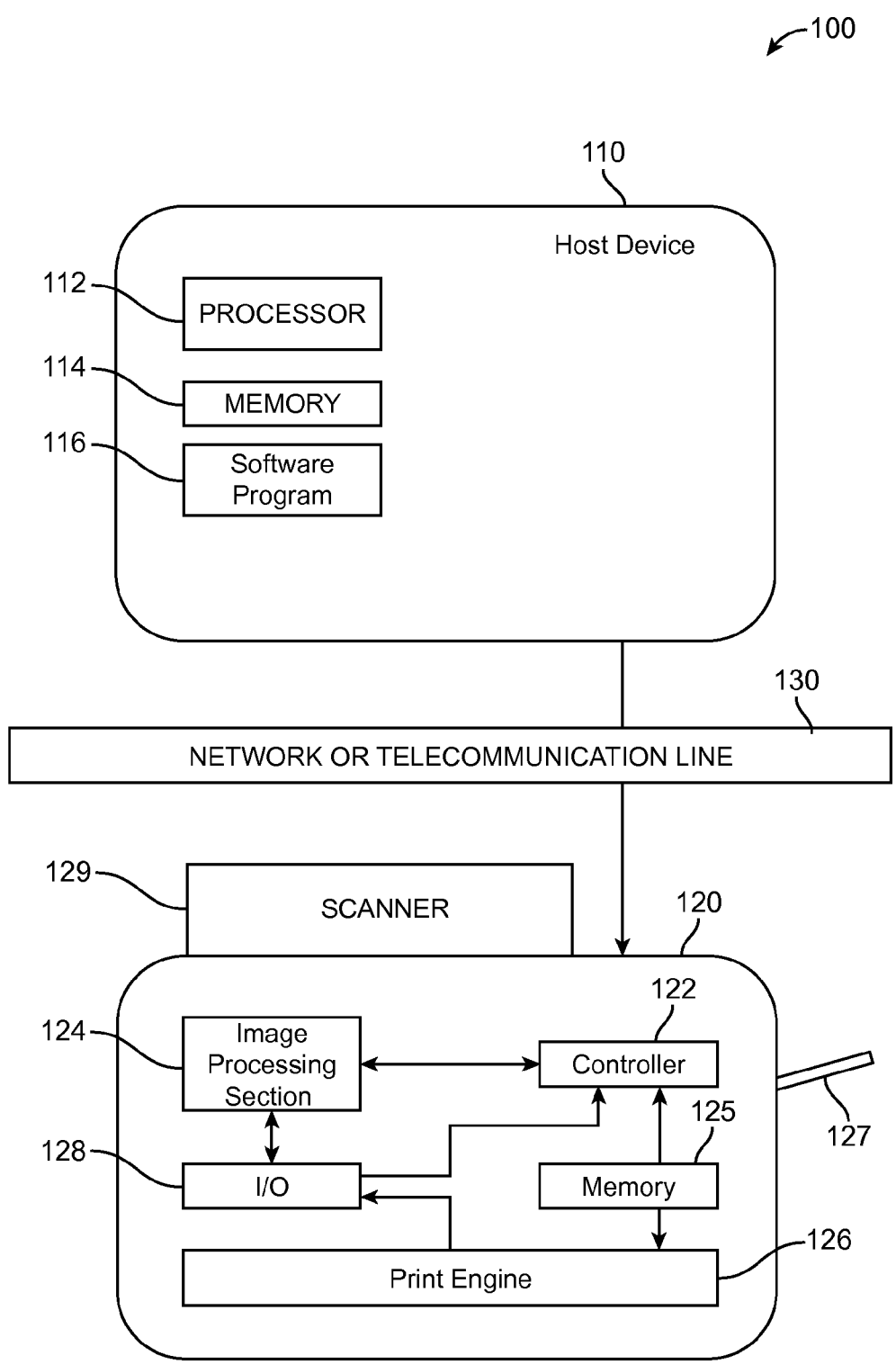
FIG. 1 is a diagram of an image forming apparatus, which receives print data in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, a system and method of determining print media attributes for print media using a print media database server. The following illustrations describe the process of this method and a system for implementation thereof.

The methods described herein can be implemented in an image forming system 100 that includes a host device 110 preferably in the form of a computer device, and an image forming apparatus 120 preferably in the form of a multi-functional printer (MFP) connected to the host device 110. A typical structure of the system 100 is shown in FIG. 1. In accordance with an exemplary embodiment, the host device 110 includes a processor 112 and one or more memories 114 for storing software programs 116 and data (such as files to be printed). The image forming apparatus (or printer) 120 typically includes a printer controller (or firmware) 122, an image processing section (or data dispatcher) 124, a print engine 126, an input/output (I/O) section 128, and a scanner 129.

The controller 122 may include a central processing unit (CPU), a random access memory (RAM), and a read only memory (ROM). The controller 122 processes the data and job information received from the host device 110 to generate a print image. The controller 122 also includes an operating system (OS), which acts as an intermediary between the software programs and hardware components within the image forming apparatus 120. The operating system (OS) manages the computer hardware and provides common services for efficient execution of various application software. In accordance with an exemplary embodiment, the controller 122 processes the data and job information received from the client device 110 to generate a print image.

The image processing section 124 carries out various image processing under the control of the controller 122, and sends the processed print image data to the print engine 126. The image processing section 124 also includes a scanner section for optically reading a document, such as an image recognition system. The scanner section receives the image from the scanner and converts the image into a digital image. The print engine 126 forms an image on a recording sheet based on the image data sent from the image processing section 124. The I/O section performs data transfer with the host device 110. The controller 122 is programmed to process data and control various other components of the image forming apparatus 120 to carry out the various methods described herein. The print engine 126 forms an image on a sheet of print medium (i.e., a recording sheet) based on the image data sent from the image processing section.

The input/output (I/O) port 128 provides communications between the printer section and the host device 110 and receives page descriptions (or print data) from the host for processing within the image forming apparatus 120. In accordance with an exemplary embodiment, the operation of printer section commences when it receives a page description from the host device 110 via I/O port 128 in the form of a print job data stream and/or fax data stream. The page description may be any kind of page description languages (PDLs), such as PostScript® (PS), Printer Control Language (PCL), Portable Document Format (PDF), and/or XML Paper Specification (XPS). The image forming apparatus 120 also preferably includes an auto feeding mechanism or tray 127, wherein a user can feed one or more sheets or pages of a printed image, cover sheet of a package of print media and/or other documents to the image processing section 124 for imaging and processing.

In accordance with an exemplary embodiment, a host device 110 and the image forming apparatus (or printer) 120 is preferably connected to one another via a public telecommunication line and/or a network (e.g., LAN or WAN) 130. Examples of the telecommunication line and/or network 130 consistent with embodiments of the invention include, but are not limited to, telecommunication or telephone lines, the Internet, an intranet, a local area network (LAN), a wide area network (WAN) and/or a wireless connection using radio frequency (RF) and/or infrared (IR) transmission.

Examples of image forming apparatuses 120 consistent with exemplary embodiments of the invention include, but are not limited to, a multi-functional printer (MFP), a laser beam printer (LBP), an LED printer, a multi-functional laser beam printer including copy function. In accordance with an embodiment, the image forming apparatus 120 is a color printer or a black and white (B/W) printer. In accordance with another embodiment, the image forming apparatus 120 is configured as a multi-functional printer (MFP) device or all-in-one (AIO) that includes a printer section for converting print data inputted from outside to image data and forming and printing out the converted image onto a printable media, a scanner section for optically reading a document (i.e., an image recognition system), and a facsimile section for facsimile receiving and transmitting image data to and from external apparatuses through public telecommunication lines.

Figure 2:
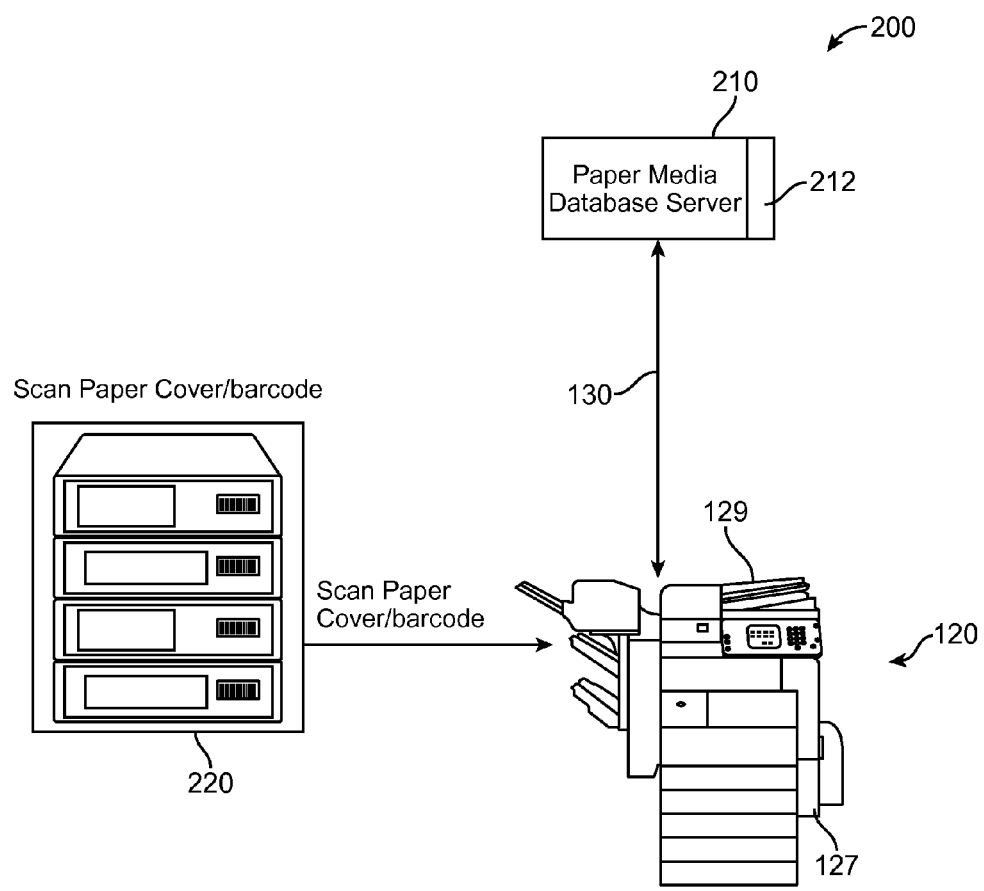
FIG. 2 is a diagram of a system, which includes an image forming apparatus and a paper media database server in accordance with an exemplary embodiment.

FIG. 2 is a diagram of a system 200, which includes an image forming apparatus 120 and at least one paper media database server 210 in accordance with an exemplary embodiment. As shown in FIG. 2, the paper media database server 210 is preferably a remote server (i.e., cloud server), which is connected to the image forming apparatus 120 via a network connection such as public telecommunication line and/or a network (e.g., LAN or WAN) 130. Examples of the telecommunication line and/or network 130 consistent with embodiments of the invention include, but are not limited to, telecommunication or telephone lines, the Internet, an intranet, a local area network (LAN), a wide area network (WAN) and/or a wireless connection using radio frequency (RF) and/or infrared (IR) transmission.

The at least one print media server 210 is preferably a computer like device having a processor and one or more memories for storing software programs and data including print media attributes for one or more print mediums. In accordance with an exemplary embodiment, the at least one paper media server 210 hosts a print media attribute database 212, which include print media attributes for one or more print mediums. In accordance with an exemplary embodiment the print media attribute database is preferably periodically updated, or alternatively per request of the image forming apparatus 120 and/or print media manufacture.

The system 200 also includes an image forming apparatus 120, which includes at least one print media tray 127, which holds a print media 220. The print media 220 is preferably a paper or paper-like media having one or more print media attributes. The print media attributes can include paper color, coating, grain direction, printing technology, brightness, CIE, tint, whiteness, labColor, etc. In order to maximize print quality, the print media attributes of each type of print media should be input into a printer configuration settings of the image forming apparatus to obtain the highest quality output. Most print media 220 is provided in reams or other known quantities, which are packaged with indicia such as information on the manufacture, size, type and other attributes of the print media. In addition, most bundles or reams of paper include a UPC (Universal Product Code) or bar code, which identifies the type of print media including manufacture thereof.

In accordance with an exemplary embodiment, when a user needs to load paper (i.e., a print medium) into the image forming apparatus 120 (i.e., multi-functional peripheral), the user can scan the cover of the print media and/or barcode of the package. In accordance with an exemplary embodiment, the scanning software associated with the scanning function of the apparatus, preferably uses an optical character recognition (OCR) function and/or other recognition method to process the indicia and/or information, which is sent to the print media server 210 (i.e., cloud server). Indicia and/or information on the package 220 can include barcodes, product codes, brands and/or trade names, and/or other identifiers of the paper or print media 220. Once the print media server 210 (or cloud server) matches the information from the database 212, the image forming apparatus (or multi-functional peripheral) 120 receives the correct paper attributes and/or printer configuration settings from the print media database server 210. By hosting the print attributes on a remote server or cloud server 210, the database 212 can serve networked image forming apparatuses 120 around the world without necessitating user intervention to obtain the print media attributes and printer configuration settings.

In accordance with an exemplary embodiment, if the database 212 does not contain an entry for the newly loaded and scanned print media 220, the software associated with the print media server 210 can extract the attributes from the optical character recognition (OCR) and graphic information and request that the print media attributes for the newly scanned print media 220 be placed within the database 212. In accordance with an exemplary embodiment, after the correctness of the newly scanned print media attributes are preferably confirmed by an administrator, at which time the print media 220 (or paper) and its attributes can be available in the print media database 212 for access by all multi-functional peripherals (MFPs) connected to the print media server 210 (or cloud server).

Figure 3:
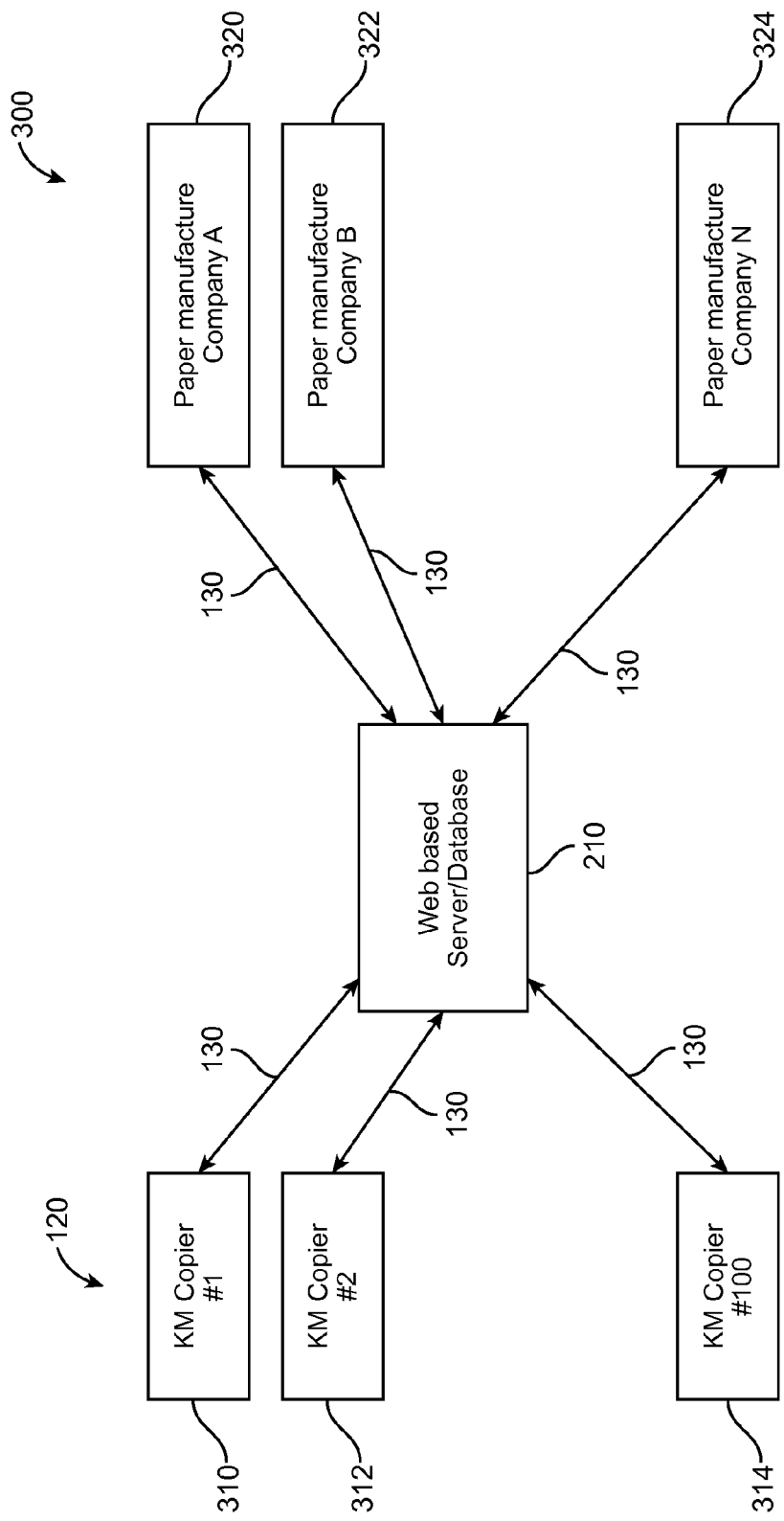
FIG. 3 is a diagram of a system, which includes a print media database server, one or more image forming apparatuses, and one or more host devices, wherein the one or more host devices send print media attributes to the print media database server.

FIG. 3 is a diagram of a system 300, which includes a paper media database server 210, one or more image forming apparatuses 310, 312, 314, and one or more host devices 320, 322, 324. As shown in FIG. 3, each of the one or more host devices 320, 322, 324 are preferably associated with one or more manufactures of print media. Each of the one or more manufactures preferably sends print media attributes to the paper media database 212 via a network connection 130. Either the print media attribute database 212 and/or the one or more host devices 320, 322, 324 can be configured to automatically at a predetermined interval request updates on any and all of the print media attributes, which are stored and hosted on the at least one print media server 210. The at least one database server 210 is preferably a plurality of database servers 210, which are located around the world to provide a plurality of image forming apparatuses 120 with access to the print attribute database 212.

In accordance with an exemplary embodiment, the print media attributes from each of the manufacturers, which are downloaded and/or received from the manufactures is reviewed and confirmed for accuracy and correctness before the print attributes are made available to each and every image forming apparatus 120 within the network of image forming apparatuses. Each of the image forming apparatuses 120 within the network preferably has access to the print media database server 210.

FIG. 4 is a chart of a plurality of print media showing print media attributes 400 for each of the print mediums. As shown in FIG. 4 in accordance with an exemplary embodiment, each of the print media attributes 410 (i.e., Paper profile or Media profile) can include descriptive name and brand, back coatings, brightness, CIE/Tint, CIE/Whiteness, dimensions (or size), engine MID, feed direction, front coatings, grain direction, hole type, imagable side, lab color value, media color name, media color name details, preprinted—yes or no, printing technology, product ID (identifier), recycled percentage, stock type, texture, thickness, and weight.

Figure 5:
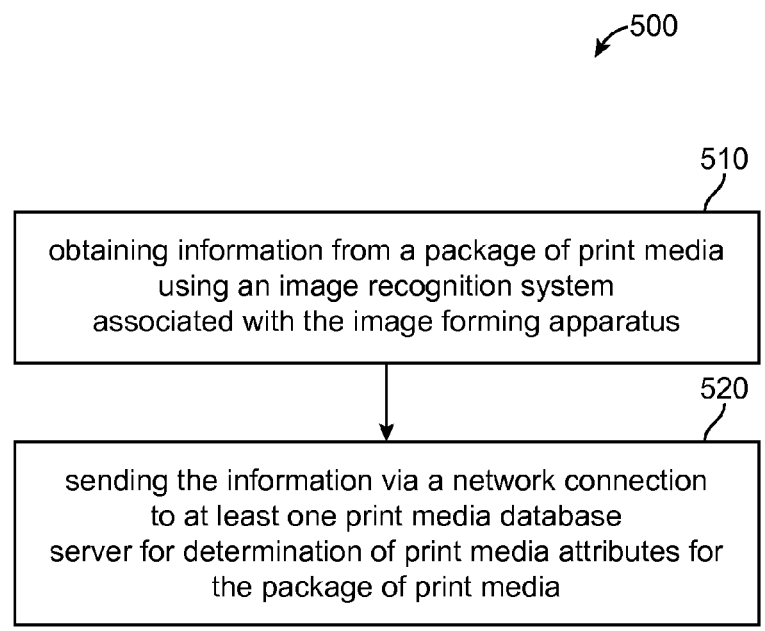
FIG. 5 is flow chart of an exemplary embodiment of a method of configuring an image forming apparatus for a plurality of print media using a print media database server showing the steps as performed in the image forming apparatus.

FIG. 5 is flow chart of an exemplary embodiment of a method of configuring an image forming apparatus for a plurality of print media using a print media database server 210 showing the steps as performed in the image forming apparatus 120. As shown in FIG. 5, in step 510, the information from a package of print media is obtained using an image recognition system associated with the image forming apparatus. In step 520, the information is sent via a network connection to at least one print media database server for determination of print media attributes for the package of print media.

Figure 6:
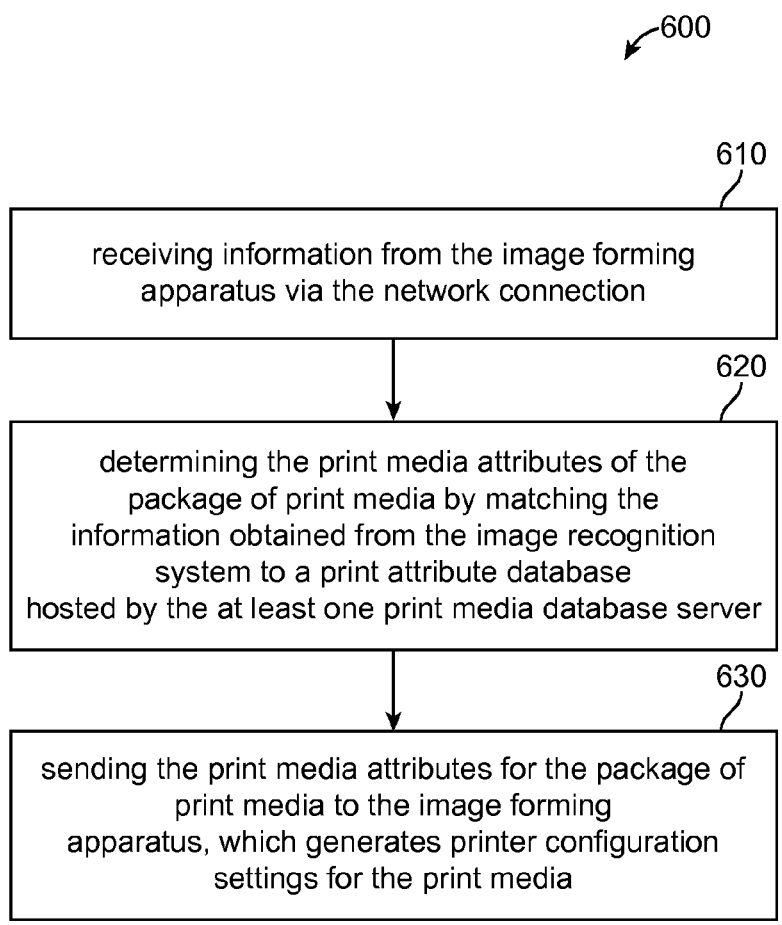
FIG. 6 is flow chart of an exemplary embodiment of a method of configuring an image forming apparatus for a plurality of print media using a print media database server showing the steps as performed by the print media database server.

FIG. 6 is flow chart of an exemplary embodiment of a method of configuring an image forming apparatus for a plurality of print media using a print media database server showing the steps as performed by the print media database server 210. As shown in step 610, the information from the image forming apparatus is received by the at least one print media database server for determination of print media attributes for the package of print media via a network connection. In step 620, the print media attributes of the package of print media is determined by matching the information obtained from the image recognition system to a print attribute database hosted by the at least one print media database server, the print attribute database containing print media attributes for a plurality of print media, which are available to a plurality of image forming apparatuses. In step 630, the print media attributes for the package of print media is sent to the image forming apparatus, which generates printer configuration settings for the print media. After the step 630, the image forming apparatus may optionally accept changes of the print media attributes as customization. For instance, the name of the print media may be modified as in many print shop environments the print media are given nicknames to represent their customers who prefer the print media, respectively.

In accordance with an exemplary embodiment, the image forming apparatus 120 generates printer configuration settings for the package of print media using the print media attributes received from the at least one print media database server 210. Alternatively, the print media database server 210 can provide the image forming apparatus 120 with printer configuration settings corresponding to information provided by image forming apparatus 120 on the package of print media.

In accordance with another exemplary embodiment, a computer program product comprising a non-transitory computer usable medium having a computer readable code embodied therein for determining print media attributes of print media. The computer readable program code is configured to execute a process, which comprises the steps of: obtaining information from a package of print media using an image recognition system associated with the image forming apparatus; sending the information via a network connection to at least one print media database server for determination of print media attributes for the package of print media; determining the print media attributes of the package of print media by matching the information obtained from the image recognition system to a print attribute database hosted by the at least one print media database server, the print attribute database containing print media attributes for a plurality of print media, which are available to a plurality of image forming apparatuses; and sending the print media attributes for the package of print media to the image forming apparatus, which generates printer configuration settings for the print media.

The computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of managing at least one print media database server for print media attributes of print media, the method comprising:

hosting print media attributes for a plurality of image forming apparatuses on the at least one print media database server, and wherein the at least one print media database server contains print media attributes for a plurality of print media from one or more manufacturers;

receiving, by the at least one print media database server, additional print media attributes from either of the one or more manufacturers and one of the plurality of image forming apparatuses;

confirming accuracy of the additional print media attributes; and enabling, by the at least one print media database server, access to the additional print media attributes in the print media database from the plurality of image forming apparatuses, after the accuracy of the additional print media attributes is confirmed.

2. The method of claim 1, wherein the print media attributes includes type and weight of the print media.

3. The method of claim 2, wherein the type of print media attributes includes at least one of the group selected from descriptive name, brand name, back coatings, brightness, CIE/Tint, CIE/Whiteness, size, feed direction, front coatings, grain direction, hole type, imagable side, lab color value, media color name, media color name details, product identifier, recycled percentage, stock type, texture, and thickness.

4. The method of claim 1, comprising:
hosting the at least one print media database on a plurality of print media database servers.

5. The method of claim 1, comprising:
updating the at least one print media database per a request from at least one of the plurality of image forming apparatuses.

6. A computer program product comprising a non-transitory computer usable medium having a computer readable code embodied therein for managing at least one print media database server for print media attributes of print media, the computer readable program code configured to execute a process, the process comprising the steps of:

hosting print media attributes for a plurality of image forming apparatuses on the at least one print media database server, and wherein the at least one print media database server contains print media attributes for a plurality of print media from one or more manufacturers;

receiving, by the at least one print media database server, additional print media attributes from either of the one or more manufacturers and one of the plurality of image forming apparatuses;

confirming accuracy of the additional print media attributes; and enabling, by the at least one print media database server, access to the additional print media attributes in the print media database from the plurality of image forming apparatuses, after the accuracy of the additional print media attributes is confirmed.

7. The computer program of claim 6, wherein the print media attributes includes type and weight of the print media.

8. The computer program of claim 7, wherein the type of print media attributes includes at least one of the group selected from descriptive name, brand name, back coatings, brightness, CIE/Tint, CIE/Whiteness, size, feed direction, front coatings, grain direction, hole type, imagable side, lab color value, media color name, media color name details, product identifier, recycled percentage, stock type, texture, and thickness.

9. The computer program of claim 6, comprising:
hosting the at least one print media database on a plurality of print media database servers.

10. The computer program of claim 6, comprising:
updating the at least one print media database per a request from at least one of the plurality of image forming apparatuses.

* * * * *